(12) United States Patent
Wagner et al.

(10) Patent No.: US 7,512,556 B2
(45) Date of Patent: Mar. 31, 2009

(54) SYSTEM AND METHOD FOR EVALUATION OF SIMULATED HEDGING RELATIONSHIP ASSIGNMENTS

(75) Inventors: Stefan Wagner, Karlsruhe (DE);
Christoph Meinel, Heidelberg (DE);
Pierre Morant, Cagnes sur mer (FR);
Wolfgang Polai, Darmstadt (DE);
Gordon Seiffart, Dossenheim (DE);
Stephane Verrando, Nice (FR)

(73) Assignee: SAP AG, Walldorf (DE)

( * ) Notice: Subject to any disclaimer, the term of this patent is extended or adjusted under 35 U.S.C. 154(b) by 892 days.

(21) Appl. No.: 10/865,065

(22) Filed: Jun. 9, 2004

(65) Prior Publication Data
US 2005/0278234 A1  Dec. 15, 2005

(51) Int. Cl.
*G06Q 40/00* (2006.01)
*G07F 19/00* (2006.01)

(52) U.S. Cl. .................. 705/35; 705/36 R; 235/379

(58) Field of Classification Search .......... None
See application file for complete search history.

(56) References Cited

U.S. PATENT DOCUMENTS

| 2002/0107774 A1* | 8/2002 | Henninger et al. ............ 705/37 |
| 2002/0111891 A1* | 8/2002 | Hoffman et al. ............. 705/36 |
| 2003/0069821 A1* | 4/2003 | Williams .................... 705/36 |
| 2004/0012624 A1* | 1/2004 | Knight ....................... 345/738 |
| 2004/0034587 A1* | 2/2004 | Amberson et al. ............ 705/36 |
| 2004/0193480 A1* | 9/2004 | Pinsonnault et al. .......... 705/10 |

FOREIGN PATENT DOCUMENTS

JP    2002083122 A   *   3/2002

OTHER PUBLICATIONS

Testing hedge effectiveness under SFAS 133 John D Finnerty, Dwight Grant. The CPA Journal. New York: Apr. 2003. vol. 73, Iss. 4.*
Testing hedge effectiveness under SFAS 133 John D Finnerty, Dwight Grant. The CPA Journal. New York: Apr. 2003. vol. 73, Iss. 4; p. 40, 8 pgs.*
Using futures contracts to hedge macroeconomic risk in the public sector Christoph Hinkelmann, Steve Swidler. Derivatives Use, Trading & Regulation. London: 2004. vol. 10, Iss. 1; p. 54, 16 pgs.*
Effect of diversification on managing revenue and risk: An empirical analysis using crude oil futures markets Reza Rahgozar, Hossein Najafi. Derivatives Use, Trading & Regulation. London: 2003. vol. 9, Iss. 2; p. 133, 17 pgs.*

* cited by examiner

*Primary Examiner*—Daniels S. Felten
*Assistant Examiner*—William E Rankins
(74) *Attorney, Agent, or Firm*—Kenyon & Kenyon LLP

(57) ABSTRACT

A system and method for evaluation of simulated hedging relationship assignments. A processor may, in response to an inputted selection of a simulated hedging relationship assignment, calculate at least one effectiveness value for the simulated hedging relationship assignment.

7 Claims, 10 Drawing Sheets

Cash Inflow from Assets

| Quarterly period | X1 | X2 | X3 | X4 | X5 | ...n |
|---|---|---|---|---|---|---|
| CASH IN FLOW AND REPRICING EXPOSURE - from assets | | | | | | |
| *Principal and interest payments:* | | | | | | |
| Long-term fixed rate | 2400 | 3000 | 3000 | 1000 | 1299 | x,xxx |
| Short-term (roll over) | 1575 | 1579 | 1582 | 1586 | 1591 | x,xxx |
| Variable rate – principal payments | 2000 | 1000 | 0 | 500 | 500 | x,xxx |
| Variable rate – estimated interest | 125 | 110 | 105 | 114 | 118 | x,xxx |
| *Total expected cash inflows* | 6100 | 5689 | 4687 | 3200 | 3409 | x,xxx |
| Variable rate asset balance | 8000 | 7000 | 7000 | 6500 | 6000 | x,xxx |
| Cash inflows and repricings | 14100 | 12689 | 11687 | 9700 | 9409 | x,xxx |

FIG. 3

| Cash Outflow from Liabilities | | | | | | |
|---|---|---|---|---|---|---|
| Principle and interest payments | | | | | | |
| Long-term Fixed Rate | 2100 | 400 | 500 | 500 | 301 | x,xxx |
| Short-term (roll over) | 735 | 737 | 738 | 740 | 742 | x,xxx |
| Variable rate – principal payments | 0 | 0 | 2000 | 0 | 1000 | x,xxx |
| Variable rate – estimated interest | 100 | 110 | 120 | 98 | 109 | x,xxx |
| Total expected cash outflows | 2935 | 1247 | 3358 | 1338 | 2152 | x,xxx |
| Variable rate liability balances | 8000 | 8000 | 6000 | 6000 | 5000 | x,xxx |
| *Cash outflows and repricings* | *10935* | *9247* | *9358* | *7338* | *7152* | *x,xxx* |
| NET EXPOSURES | 3165 | 3442 | 2329 | 2362 | 2257 | x,xxx |

FIG. 4

| Hedging Analysis | | | | | | |
|---|---|---|---|---|---|---|
| Quarterly Period | X1 | X2 | X3 | X4 | X5 | ...n |
| Net cash flow and repricing exposures | 3165 | 3442 | 2329 | 2362 | 2257 | x,xxx |
| *Pre-existing swaps outstanding:* | | | | | | |
| Receive-fixed, pay-variable (notional amounts) | 2000 | 2000 | 1200 | 1200 | 1200 | x,xxx |
| Pay-fixed, receive-variable (notional amounts) | -1000 | -1000 | -500 | -500 | -500 | x,xxx |
| *Net exposure after pre-existing swaps* | 2165 | 2442 | 1629 | 1662 | 1557 | x,xxx |
| *Transactions to adjust outstanding hedging positions* | | | | | | |
| Received-fixed, pay variable swap 1 (notional amount, 10 years) | 2000 | 2000 | 2000 | 2000 | 2000 | x,xxx |
| Pay-fixed, receive-variable swap 2 (notional amount, 3-years) | | | -1000 | -1000 | -1000 | x,xxx |
| Swaps .....X | | | | | | x,xxx |
| Unhedged cash flow and repricing exposure | 165 | 442 | 629 | 662 | 557 | x,xxx |

FIG. 6

SYSTEM AND METHOD FOR EVALUATION OF SIMULATED HEDGING RELATIONSHIP ASSIGNMENTS

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND INFORMATION

Banks enter into a large number of transactions in the ordinary course of their operations. Some of these transactions carry financial risk. For example, with individual loans the risks typically include a risk of debtor default or risks presented by changing interest rates for variable rate loans or imminently mature loans (whose principal likely will be reinvested at a new interest rate). Typically, banking regulations require that banks own other instruments whose behavior counterbalances risks presented by the first instruments. This is called "hedging." Risks presented by a first, typically large, set of instruments (called, "hedged items" herein) are counterbalanced by performance of a second, typically much smaller, set of instruments (called, "hedging instruments" herein), such that when risk rises in the hedged items, risk falls in the hedging instruments. The hedged items and the hedging instruments may be grouped into one or more hedging relationships. On a cash flow basis, for each hedging relationship, the performance of the hedging instruments must match the performance of the hedged items within a predetermined criterion. As noted, these criteria typically are established by regulation but they also may be set by a bank's individual hedging policy.

To ascertain whether a bank's financial positions meet the prescribed hedging requirement, a system for evaluating cash flows of each hedging relationship's hedged items and hedging instruments may be used. The types and number of transactions into which a bank enters may constantly change and instruments held by a bank may mature. Since a bank's hedged items and hedging instruments constantly change, a bank must actively manage its hedging positions. If a bank determines that it does not own sufficient hedging instruments to effectively hedge a set of hedged items, the bank must search for and purchase additional instruments to render its hedging position compliant.

Accordingly, there is a need in the art for a system and method for determining the effectiveness of simulated assignments of hedging instruments to hedging relationships.

BRIEF DESCRIPTION OF THE DRAWINGS

FIG. 3 is a table that illustrates example calculated cash inflows from assets, according to an embodiment of the present invention.

FIG. 4 is a table that illustrates example calculated cash outflows from liabilities, according to an embodiment of the present invention.

FIG. 6 is a table that illustrates example calculations of a hedging relationship effectiveness analysis, according to an embodiment of the present invention.

DETAILED DESCRIPTION

Embodiments of the present invention generally relate to a computer system that assists an operator to manage hedging operations performed by a bank. The computer system evaluates a series of hedging relationships to determine whether currently-defined hedging relationships are effective. Moreover, the system supports simulation of hedging instruments and simulation of assignments of hedging instruments to hedging relationships to determine whether the simulated assignments would be effective.

It is well known in the art for the computer system to store in a database data objects representing the hedged items and hedging instruments owned by a bank. A stored data object representing a hedged item may include cash flow data. For example, cash flow calculations that do not depend on market conditions may be stored as part of the data object representing the hedged item. An example of a cash flow calculation that does not depend on market conditions may be a cash flow associated with a principal payment of a loan. The principal payment is not affected by, for example, rate changes.

The computer system may also store data representing one or more hedging relationships. Each hedging relationship definition may include parameter data. The parameter data may define a class of hedged items that belong to the hedging relationship. Each hedging relationship may further include identifiers of hedging instruments that also belong to the hedging relationship. Typically, the hedging relationship definition directly addresses the hedging instruments, for example, by the hedging instrument identifiers.

Figure 1:
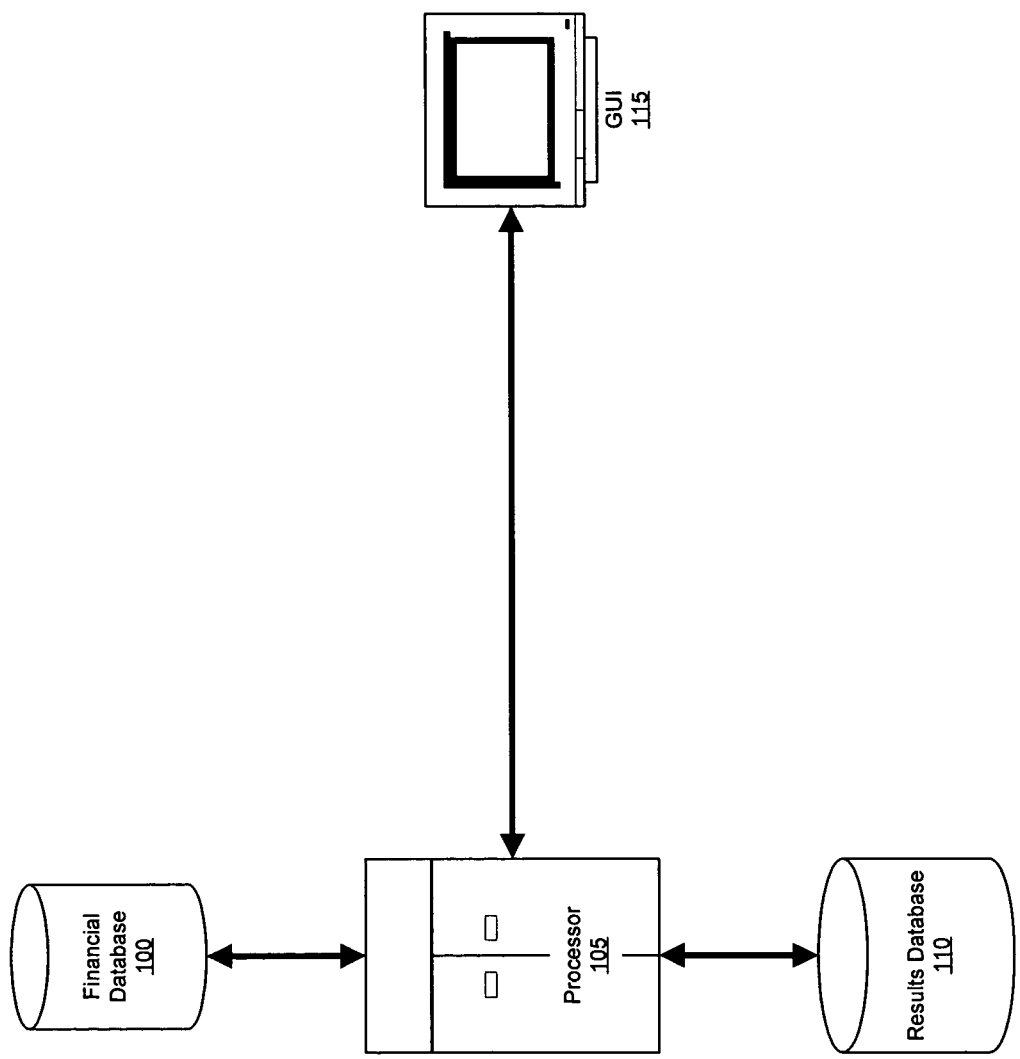
FIG. 1 is a block diagram that illustrates the components of an example system, according to an embodiment of the present invention.

FIG. 1 is a block diagram that illustrates components of a system according to an example embodiment of the present invention. A financial database 100 may be provided to store data relevant to a bank's financial transactions. For example, hedged items, hedging instruments, and hedging relationship definitions may be stored in financial database 100. An instrument specific hedging instrument ID may be assigned to each hedging instrument. Each hedging relationship may be assigned a number of hedging instrument IDs and a hedged item characteristic set. A characteristic set may include parameter data, e.g., a loan's interest rate, the currency in which the loan is transacted, payment frequency, principal balance, etc. Any item in the financial database, the characteristics of which match the relationship's characteristic set, is a member of the set of hedged items of the particular relationship.

Aside from hedging instruments assigned to particular hedging relationships for hedging against the risk of the relationships' hedged items, a bank may also own additional hedging instruments that are not assigned to particular hedging relationships. The unassigned hedging instruments may also be stored in financial database 100.

Figure 2:
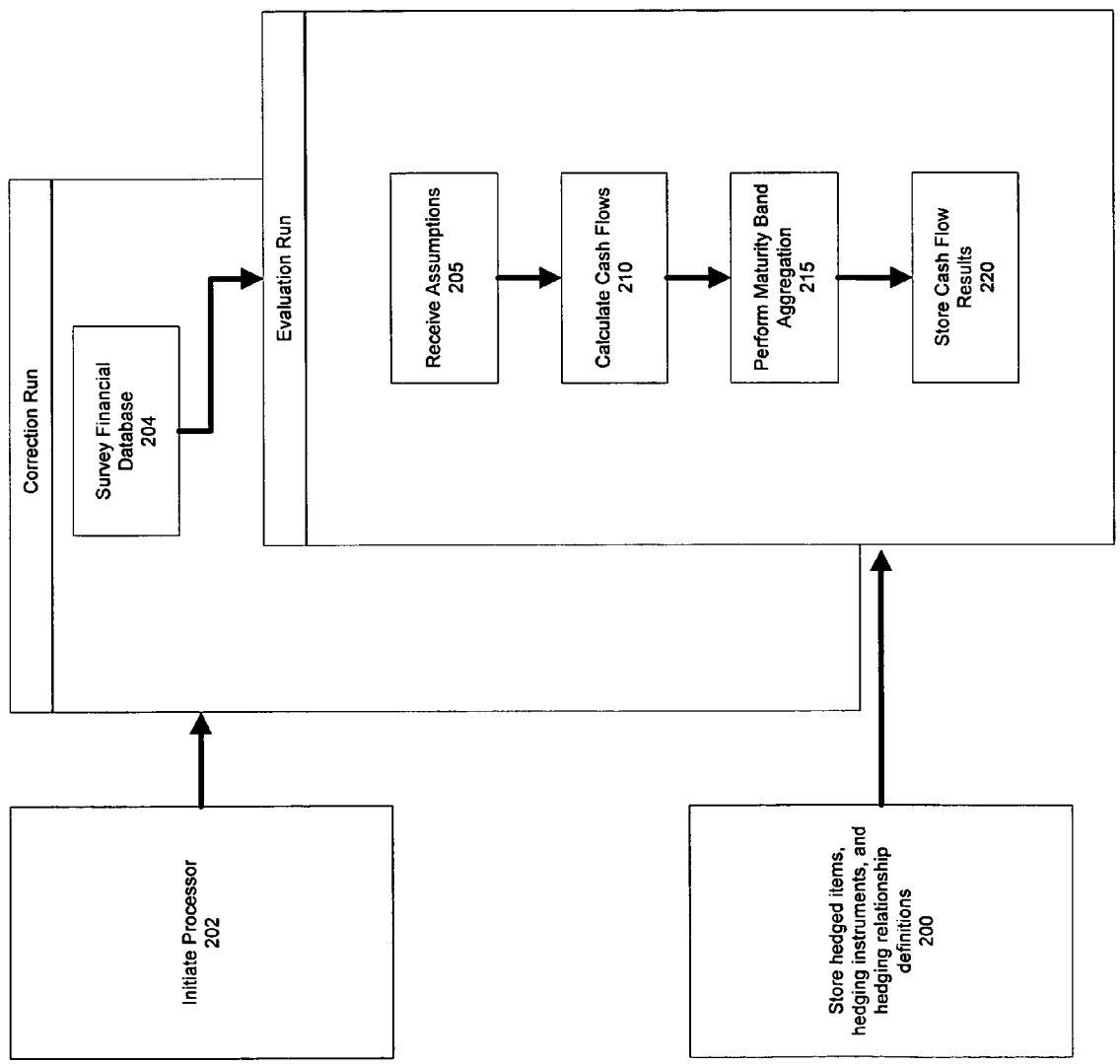
FIG. 2 is a flowchart that illustrates an example procedure in which an evaluation and/or correction run may be performed, according to an embodiment of the present invention.

A bank's financial positions may constantly change. Accordingly, hedged items of a particular hedging relationship may constantly change. It is well known in the art to update financial database 100 to reflect the continuous changes to the bank's financial positions. For example, financial database 100 may be updated daily to reflect the changes.

Where market conditions affect an instrument's cash flow, it is well known in the art for systems to perform evaluation runs, in which to calculate the instrument's cash flow. According to an embodiment of the present invention, a processor 105 may be provided to perform an evaluation run, in which to calculate the market condition dependent cash flows of each hedged item and hedging instrument stored in financial database 100. FIG. 2 is a flowchart that illustrates an example procedure in which to perform an evaluation run. In 200, a user may store in financial database 100 hedged items, hedging instruments, and hedging relationship definitions. In 210, processor 105 may calculate the cash flows periodically, e.g., hourly, daily, etc. The cash flow calculations may be made according to particular assumptions. These may include assumptions regarding market conditions, likelihood of payment default, prepayment assumptions, etc. For example, a hedged item may be a loan with a variable interest rate. As the interest rate changes, the loan's cash flow may change. Accordingly, to calculate the loan's cash flow, assumptions may be made concerning the future interest rate. In 205, processor 105 may receive user input of market condition assumptions and other assumptions according to which processor 105 is to calculate, in 210, the cash flow of each hedged item and hedging relationship.

According to one embodiment of the present invention, processor 105 may periodically calculate the cash flows of all hedged items and hedging instruments stored in financial database 100. According to an alternative embodiment, processor 105 may periodically calculate the cash flows of all hedged items and of only those hedging instruments that have been assigned to hedging relationships.

In 215, processor 105 may perform a maturity band aggregation in which to synchronize calculated cash flows according to specified time periods. For example, the effectiveness test may require cash flow results of each hedged item and hedging instrument to be calculated at particular time intervals (called "maturity bands"). The cash flow expectation calculations performed for each hedged item may not be synchronized to these maturity bands. The system therefore sums all cash flow data for a hedged item for each maturity band to synchronize the data with requirements of the effectiveness test. For example, payments for a particular loan may be due on the eleventh of each month. Prior to a maturity band aggregation, processor 105 may determine, in 210, that the loan will generate for the bank an income of $0 on January 11, $4,500 on February 11, $4,500 on March 11, etc. Subsequent to the maturity band aggregation, processor 105 may determine that the loan will generate for the bank an income of $0 on January 10, $0 on February 10, $4,500 on March 10, etc.

FIGS. 3 and 4 are tables that illustrate the cash flows of hedged items of a selected relationship. FIG. 3 illustrates calculated cash inflows from assets. A financial institution, e.g., a bank, may own many types of assets. The assets may include, e.g., fixed rate assets, variable rate assets, long-term assets, and short-term assets. With respect to short-term assets, a user may indicate to processor 105 as one of the assumptions that the holdings will roll over, i.e. that when the term expires, funds will be reinvested, e.g., in similar assets. FIG. 4 illustrates calculated cash outflows from liabilities. Each of the tables illustrates the cash flows after processor 105 performs a maturity band aggregation in 215, so that the cash flows are grouped according to quarterly periods.

A results database 110 may be provided in which to store results of calculations performed during the evaluation run by processor 105. After processor 105 calculates the cash flow of each hedged item and hedging instrument, e.g., after the maturity band aggregation, processor 105 may, in 220, store the results in results database 110.

In an embodiment of the present invention, the system may permit hedging relationships to be grouped according to a hierarchy. Hedged items and hedging instruments may be grouped together as part of a particular hedging relationship. Many relationships may be further grouped according to a shared variable interest rate. For example, all relationships that include hedged items and hedging instruments that have an interest rate of prime plus 1% may be grouped together. Many different interest rate groups may be further grouped together according to currency with which the underlying hedged items and hedging instruments are transacted. According to one embodiment, a data object that represents a hedging relationship may include data fields that indicate the currency and interest rate shared by the relationship's underlying transactions. According to this embodiment, hedging relationships may grouped in the hierarchy by currency and interest rate in accordance with the relationship's currency and interest rate data fields.

Figure 5:
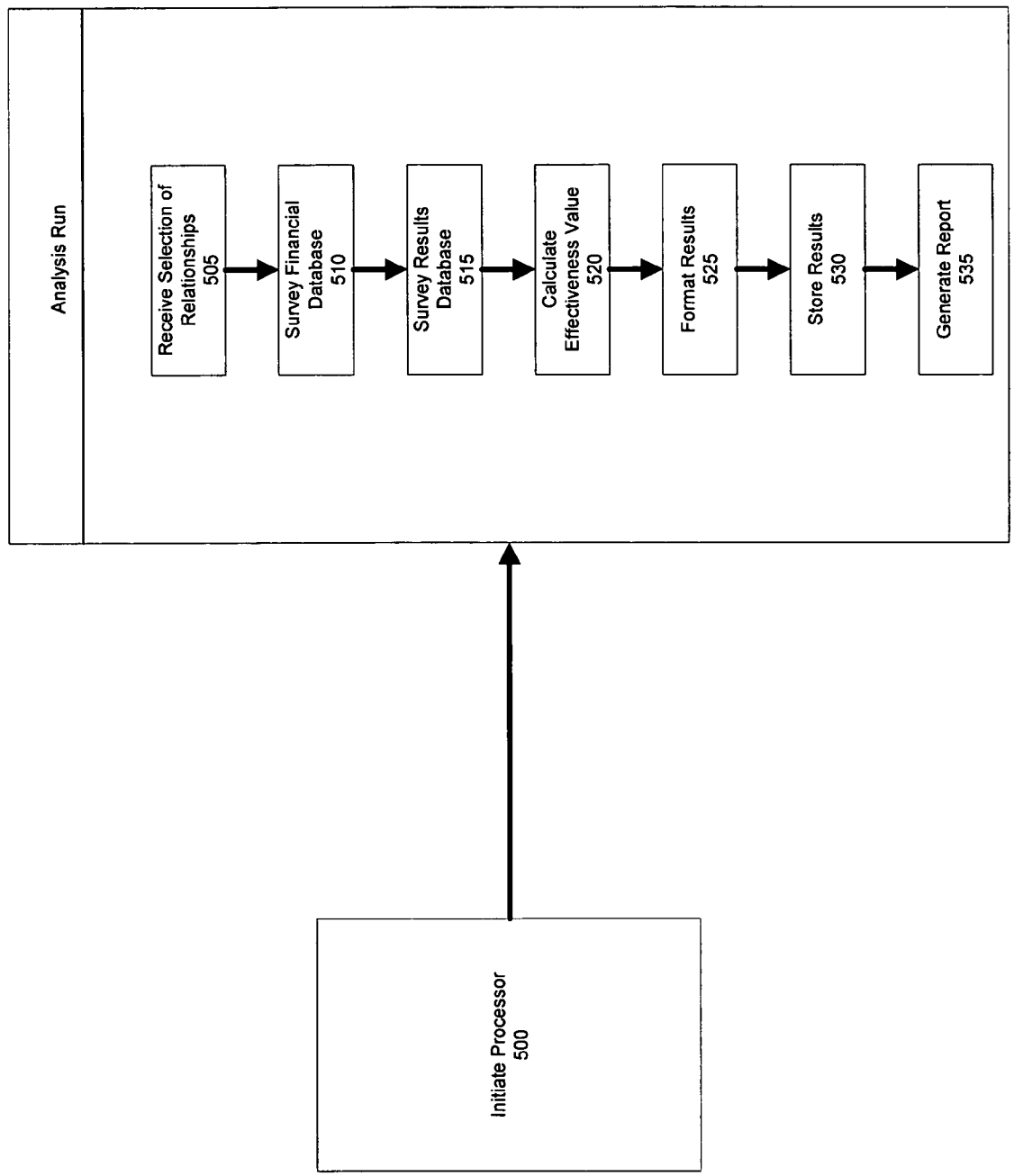
FIG. 5 is a flowchart that illustrates an example procedure in which an analysis run may be performed, according to an embodiment of the present invention.

It is well known in the art to perform an analysis run, in which to calculate the effectiveness of hedging relationships. A user may initiate processor 105 to perform an analysis run for particular hedging relationships. FIG. 5 is a flowchart that illustrates a procedure in which an analysis run may be performed. In contrast to cash flow calculations of the evaluation run, which are performed periodically for all hedged items and hedging instruments stored in financial database 100, processor 105 may selectively perform effectiveness calculations when a user, in 500, initiates processor 105 to perform the effectiveness calculations. The user may indicate to processor 105 select relationships for which to perform the effectiveness calculations, e.g., by selecting one or more relationships from a list of relationships, or by any means of selection. For example, each defined relationship may be assigned a hedging relationship definition ID. To select a particular relationship, the user may select a particular definition ID. In 505, processor 105 may receive the user selected hedging relationships. According to one embodiment, a user may select groups of relationships at a time by selecting all hedging relationship that belong to a particular parent node of the hierarchy. For example, a user may select all hedging relationships that share a particular interest rate.

After processor 105 receives the user selection, processor 105 may, for each selected relationship, determine the relevant hedged items and hedging instruments. To do so, processor 105 may, in 510, survey financial database 100 for the hedging instruments, the hedging instrument IDs of which correspond to the hedging instrument IDs of the relationship, and for all hedged items, the characteristics of which match the characteristic set of the relationship. In 515, processor 105 may survey results database 110 for cash flow results of each hedging instrument and hedged item of a selected relationship.

FIG. 6 is a table that illustrates calculated cash flows of hedging instruments of a selected relationship and calculated relationship effectiveness values. The table imports the net cash flows of the hedged item cash flows. The table then illustrates cash flows of hedging instruments, i.e. swaps.

For each selected relationship, processor 105 may, in 520, calculate an effectiveness value that represents the relationship's effectiveness. For example, processor 105 may calculate a ratio of the cash flows of all the relationship's hedged items to the cash flow of the relationship's hedging instrument. Alternatively, processor 105 may calculate a value that indicates a dollar amount of remaining risk exposure. For example, for a particular relationship, the hedged items' cash flow may be $1,200; and the hedging instruments' cash flow may be $1,000. Processor 105 may return value of $200, the dollar amount of unhedged risk.

The table of FIG. 6 illustrates a further example of the effectiveness calculation. The table illustrates that in a first quarterly period, the hedged items' calculated net cash flow is 3165, and the hedging instruments' net cash flow is 2000−1000=1000. Processor 105 may therefore calculate, in 520, that the relationship's unhedged risk is 3165−1000=2165.

In 525, processor 105 may format the results of the effectiveness calculation to be in a readable form, rather than as a set of unorganized values. For example, processor 105 may store as the results of the effectiveness calculation, the tables of FIGS. 3, 4, and 6. In 530, processor 105 may store the results of each effectiveness calculation in results database 110. As part of the results, processor 105 may store the cashflow breakdown of the hedged items and hedging instruments.

In 535, processor 105 may generate a report of the results of the effectiveness calculations. The report may be transmitted toward a user. The report may be one in which hedging relationships and their respective cash flow and effectiveness values are grouped according to the relationship hierarchy. For example, processor 105 may generate a report with root headings, such as currency, and sub-headings, such as interest rate, etc., down to the hedging relationships with the respective values.

A user may determine that a hedging relationship is effective if the respective calculated effectiveness value meets criteria, e.g., set by government regulations, or set by internal bank requirements, etc. Generally, a relationship that has a ratio value of less than 1 is deemed effective.

It is well known in the art to perform a correction run. Between periodic evaluation runs, processor 105 may be initiated to perform a correction run. During a correction run, processor 105 may perform the same tasks performed during an evaluation run. However, unlike the evaluation run, the correction run may be performed, not automatically on a periodic basis, but rather in response to a user initiation. Additionally, unlike the evaluation run, the correction run may not be performed upon all hedged items and hedging instruments stored in financial database 100; rather the correction run may be performed upon only particular hedging instruments.

Between periodic evaluation runs, financial database 100 may be updated. A new hedging instrument may be added, an old instrument dropped, and previously unassigned instruments may be assigned to hedging relationships.

In 202, a user may initiate processor 105 to perform a correction run for selected hedging relationships. In response, processor 105 may, in 204, survey financial database 100 for all hedged items and hedging instruments of the selected relationships. To do so, for each selected relationship, processor 105 may search for all hedged items, the characteristics of which match the characteristics set of the selected relationship, and for all hedging instruments, the IDs of which match hedging instrument IDs of the selected relationship. Of the hedging instruments of the selected relationships, processor 105 may, in 210, calculate the cash flows of only those hedging instruments, the cash flows of which were not calculated in the previous evaluation run. According to the embodiment in which cash flows of unassigned hedging instruments are not calculated, if a previously unassigned hedging instrument is assigned to a hedging relationship selected for a correction run, processor 105 may calculate the cash flow of the newly assigned hedging instrument during the correction run.

Figure 7:
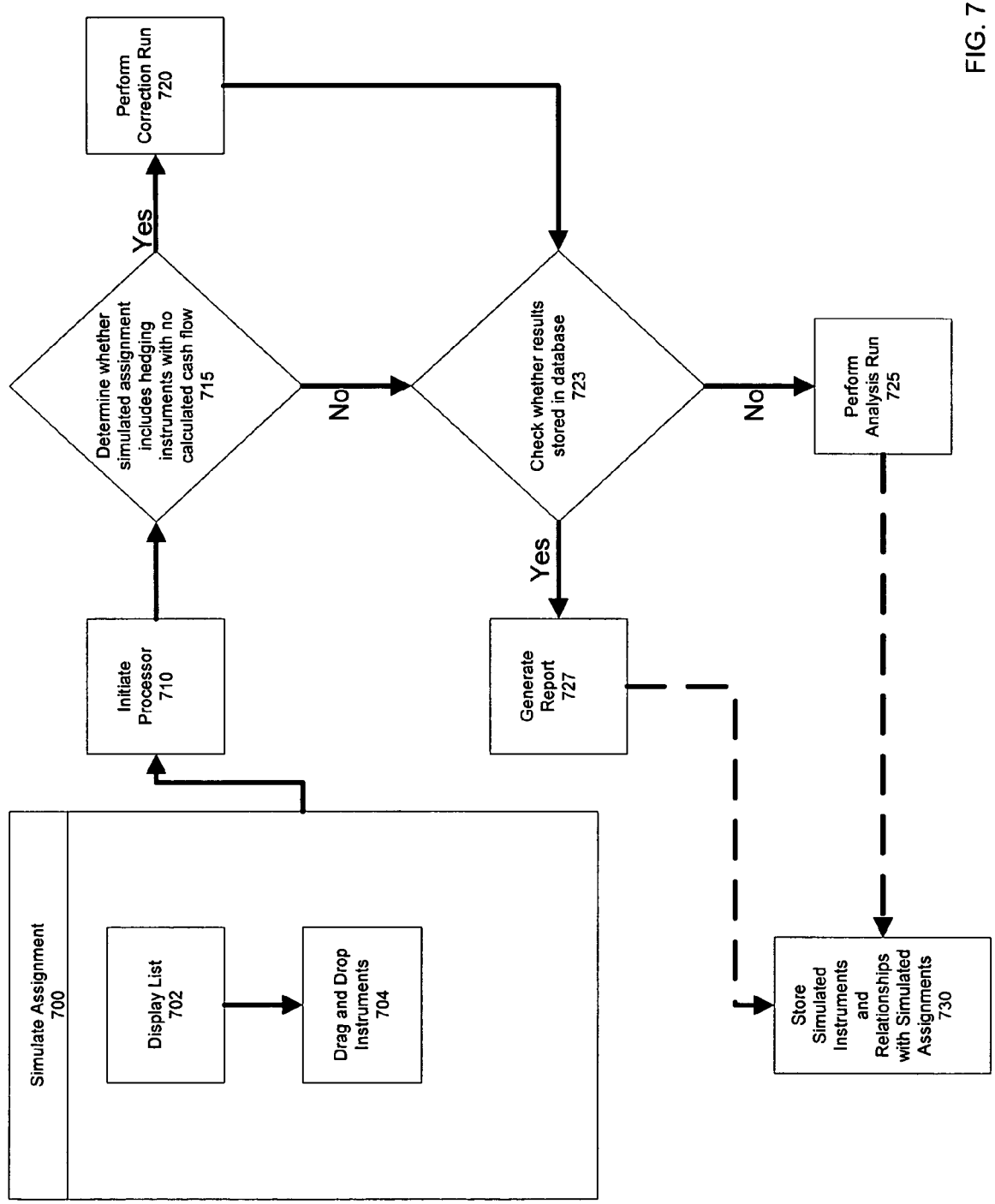
FIG. 7 is a flowchart that illustrates an example procedure in which to simulate hedging relationships and determine the effectiveness of the simulated relationships, according to an embodiment of the present invention.

Current systems do not provide for simulating hedging instruments or simulating assignments of hedging instruments to hedging relationships. FIG. 7 is a flowchart that illustrates an example procedure in which to simulate an assignment of a hedging instrument to a hedging relationship and determine the effectiveness of the simulation. In an embodiment of the present invention, a user may, in 700, simulate theoretical assignments of hedging instruments to hedging relationships and may, in 710, initiate processor 105 to calculate the effectiveness of the simulated assignments. To simulate an assignment in 700, a user may, e.g., assign a previously unassigned hedging instrument to a hedging relationship, add to a relationship a new hedging instrument, remove a hedging instrument from a relationship for insertion in the category of unassigned instruments, and/or move an instrument from one hedging relationship to another hedging relationship. For example, the table of FIG. 6 illustrates the results of an effectiveness calculation after new simulated hedging instruments are added to a relationship. In the first quarter of the illustrated example, the cash flow of a simulated hedging instrument is 2000. The results of the effectiveness calculation may now be 2165−2000=165.

In one embodiment of the present invention, a user may simulate assignments for only those hedging instruments for which an evaluation run or correction run has been performed. According to this embodiment, before a user simulates an assignment of a hedging instrument for which cash flows have not been calculated, the user must initiate a correction run or wait for an evaluation run to be performed for the hedging instrument.

In an alternative embodiment, the system may automatically perform a correction run for those hedging instruments of an inputted simulated assignment, the cash flows of which were not previously calculated. According to this embodiment, in 715, processor 105 may determine whether a simulated assignment includes hedging instruments, cash flows of which were not calculated in the previous evaluation run. If processor 105 determines that the user has initiated processor 105 to calculate the effectiveness of a simulated assignment that includes such hedging instruments, processor 105 may, in 720, perform a correction run for those hedging instruments. For example, according to the embodiment in which processor 105 does not perform the evaluation run for unassigned instruments, if the user simulates an assignment of an unassigned instrument to a relationship, processor 105 may perform the correction run for the unassigned instrument. As an additional example, if the user simulates an entirely new hedging instrument that is not stored in financial database 100, processor 105 may perform the correction run for the simulated hedging instrument. Processor 105 may then, in 725, perform an analysis run.

In an embodiment of the present invention, processor 105 may, in 530, store in results database 110, results of cash flow calculations of simulated instruments, and results of effectiveness calculations of simulated relationships. Processor 105 may also, in 730, store in results database 110 the simulated instruments and the relationships with simulated assignments. By way of example, processor 105 may store the simulated instruments and the relationships with the simulated assignments, e.g., as soon as a user indicates a desire to do so, upon initiation for an analysis run, or after performing the analysis run.

In an embodiment of the present invention, a graphical user interface (GUI) 115 may be provided. GUI 115 may, in 702, display for a user, e.g., in a screen window, a list of hedged items, hedging instruments, and hedging relationships. The list may include unassigned hedging instruments, simulated hedging instruments, and hedging relationships that have simulated hedging instrument assignments.

According to one embodiment, the GUI may list only those hedging instruments and hedging relationships, cash flows of which were determined in a previous evaluation or correction run. According to an alternative embodiment, the GUI may list all existing hedging instruments and relationships.

Figure 8:
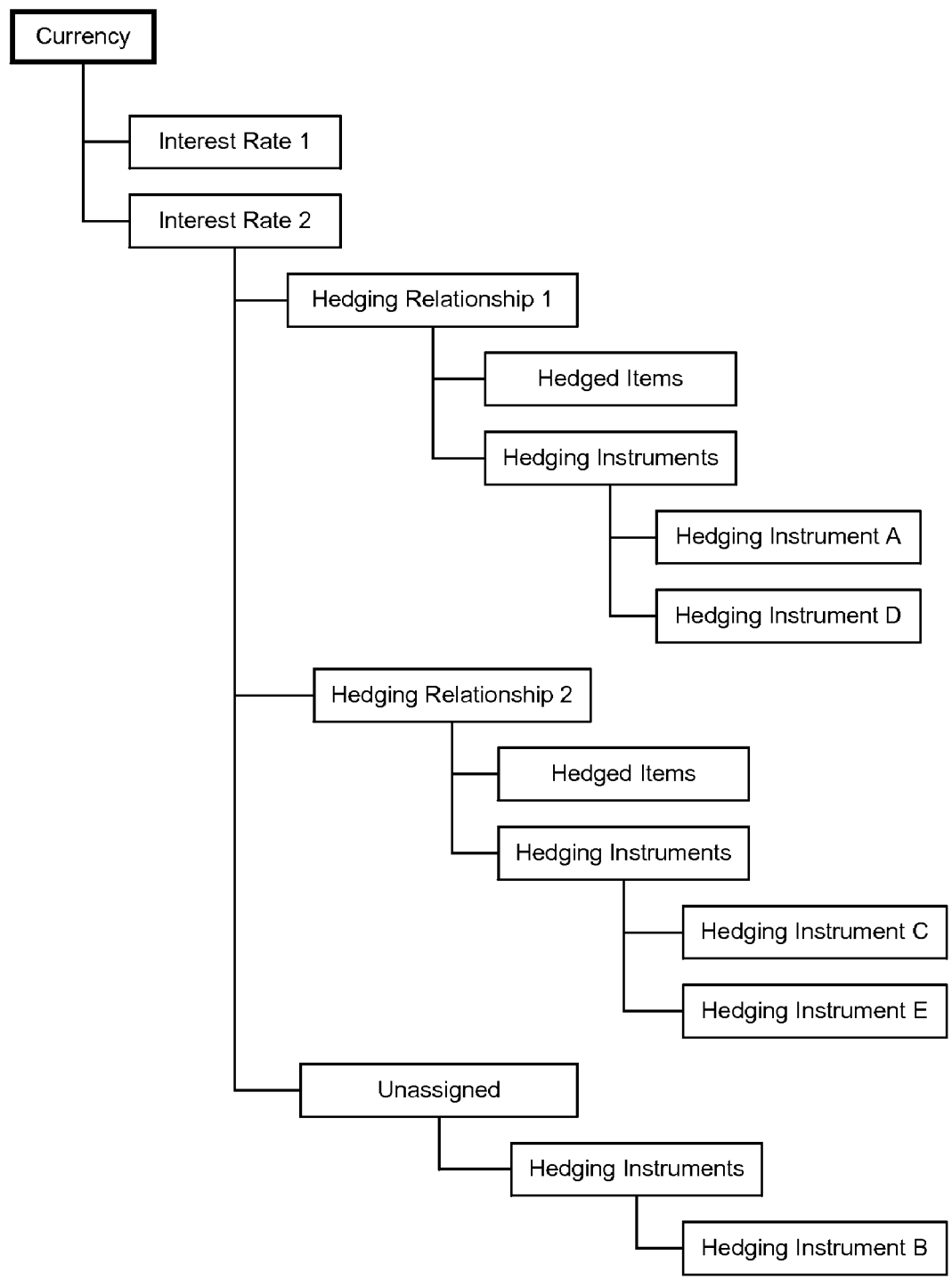
FIG. 8 illustrates an example display of a hedging relationship hierarchy, according to an embodiment of the present invention.
Figure 9:
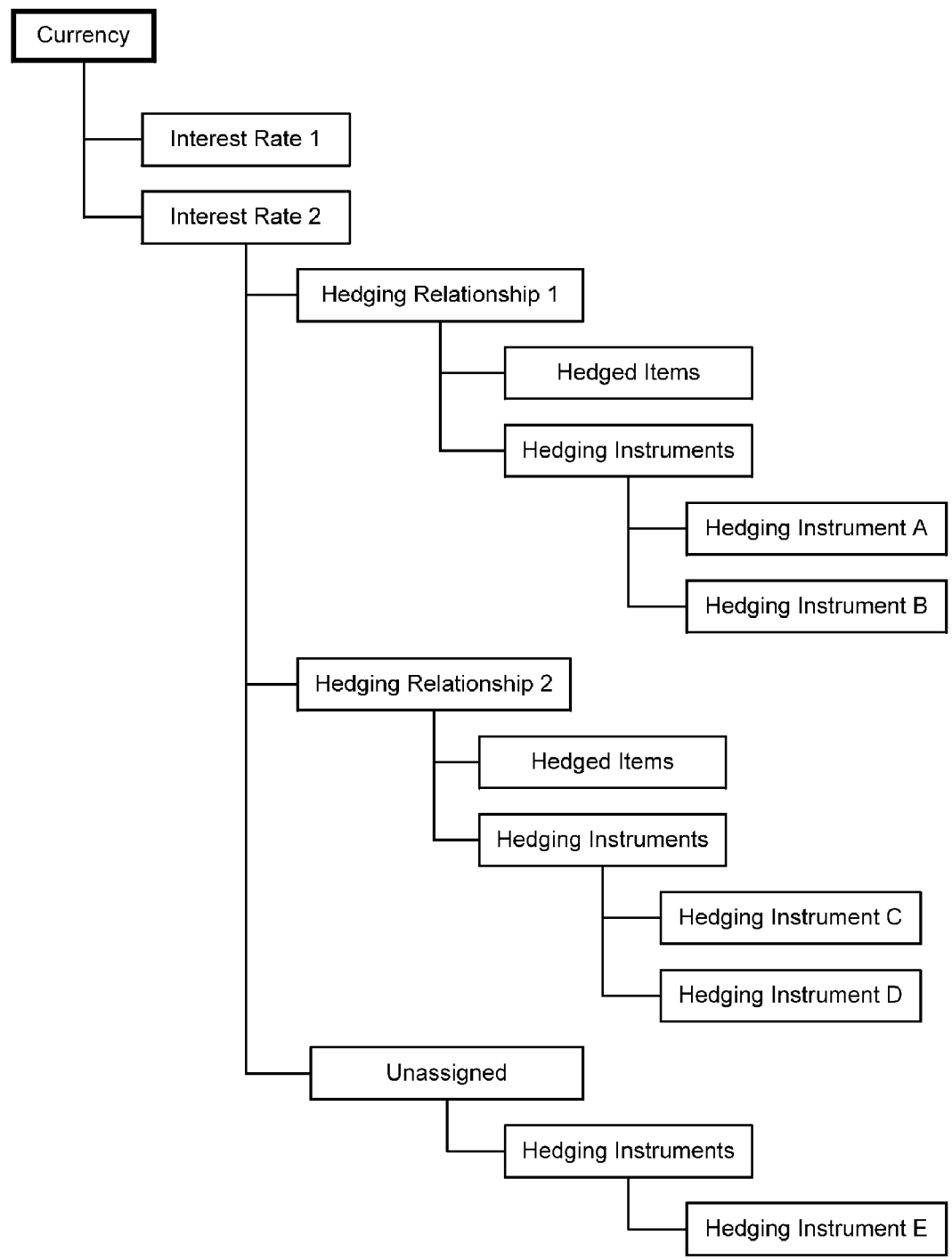
FIG. 9 illustrates an example display of a hedging relationship hierarchy after a hedging instrument assignment simulation, according to an embodiment of the present invention.

In an embodiment of the present invention, GUI 115 may display the list in a tree-like structure according to the hedging relationship hierarchy, as illustrated in FIG. 8. To simulate an assignment, a user may, in 704, drag and drop hedging instruments. The user may select, e.g., via a mouse click, a displayed hedging instrument and drag the selected hedging instrument to other displayed hedging relationships. For example, the user may: drag hedging instrument B from the unassigned listing to hedging relationship 1; drag hedging instrument E from hedging relationship 2 to the unassigned listing; and drag hedging instrument D from hedging relationship 1 to hedging relationship 2. FIG. 9 illustrates the display of the resulting simulated assignments of hedging instruments to hedging relationships 1 and 2.

According to one embodiment, only those hedging instruments, cash flows of which were determined in a previous evaluation or correction run, may be dragged to simulate a new assignment. According to an alternative embodiment, any hedging instrument of the system may be dragged to simulate a new assignment.

After creating new simulated assignments, a user may, in 710, initiate processor 105 to calculate the effectiveness of a particular hedging relationship with simulated hedging instrument assignments. In response, processor 105 may, in 520, calculate the effectiveness of the relationship with the simulated assignments and return the result to the user. In an embodiment of the present invention, processor 105 may, in 530, store the result of an effectiveness calculation for the relationship that has the simulated assignments in a database. According to this embodiment, when the user initiates processor 105 to calculate the effectiveness of a relationship that has simulated assignments, processor 105 may, in 723, check whether the result for the relationship is stored in the database. If the result is found in the database, processor 105 may, in 727, generate a report and return to the user the result from the database, without recalculating the effectiveness of the relationship.

Figure 10:
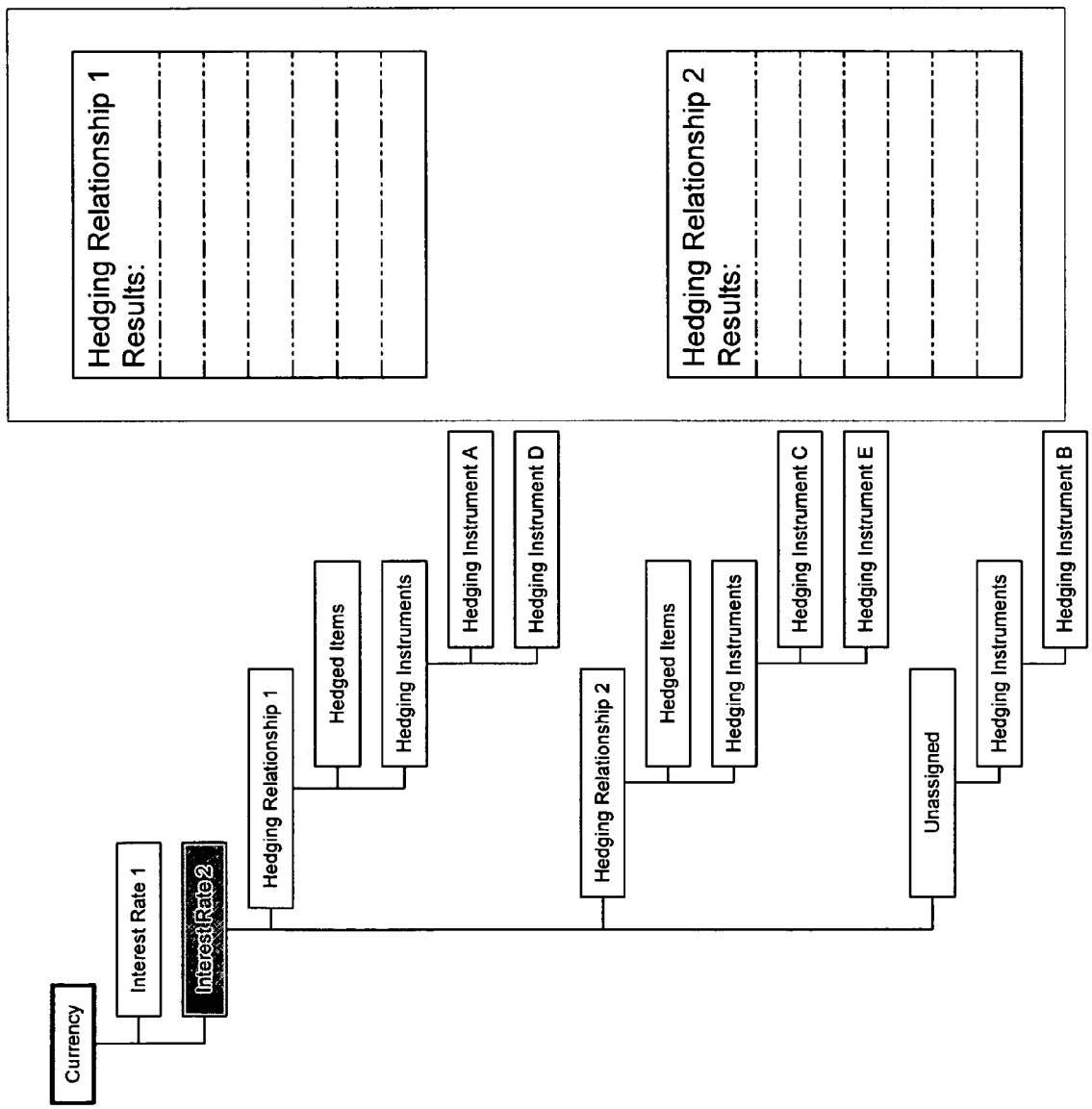
FIG. 10 illustrates an example display of a hedging relationship hierarchy and a display of effectiveness results for a selected relationship, according to an embodiment of the present invention.

In an embodiment of the present invention, a user may select a particular hedging relationship by clicking on the particular displayed hedging relationship. Alternatively, the user may click on a displayed parent node in the relationship hierarchy in which are grouped many hedging relationships. By clicking on that one node, the user may select all child relationships of the selected parent node. FIG. 10 illustrates the relationships of FIG. 8 with the "interest rate 2" node selected. By clicking on this parent node, both hedging relationships 1 and 2 may be selected. After a user selects a group of relationships, the user may initiate processor 105 to calculate the effectiveness of each of the selected relationships.

In an embodiment of the present invention, when a user selects a relationship, e.g., displayed in a screen window, processor 105 may return, and GUI 115 may display, e.g., in a separate section of the same screen window, effectiveness results for the selected relationship.

In one embodiment of the present invention, a user may select only one relationship at a time. The results for that one relationship may be displayed. According to an alternative embodiment, the user may select multiple relationships simultaneously, for example by selecting a parent node. For example, in FIG. 10, a user may select the "interest rate 2" node. According to this embodiment, GUI 115 may display, next to the displayed hedging relationship hierarchy, the effectiveness results for one of the selected hedging relationships. For example, by default, GUI 115 may display the effectiveness results for selected hedging relationship 1. The GUI 115 may also provide navigation icons for choosing other of the selected relationships for display of the effectiveness results. Alternatively, GUI 115 may display results for multiple relationships simultaneously, e.g., for both selected relationships 1 and 2. The displayed results may be a ratio, or any other effectiveness result. In one embodiment, GUI 115 may additionally display in the results section of the screen window, the cash flow calculations of each of the hedged items and hedging instruments of the selected relationships.

After simulating many different assignments of hedging instruments to various hedging relationships, a user may determine that a particular simulated assignment is advantageous. In an embodiment of the present invention, a user may indicate to processor 105 that the particularly advantageous simulated assignments is to be stored, in 730, as a "proposed hedging relationship." In one embodiment, a dedicated database may be provided for storing proposed hedging relationships. In an alternative embodiment, results database 110 may store proposed hedging relationships.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method for evaluation of hedging relationships, comprising:

in response to an inputted selection of a simulated hedging relationship assignment, calculating at least one effectiveness value for the simulated hedging relationship assignment; and displaying a hierarchical tree-structured list of hedging relationship definitions and of simulated hedging relationship assignments, including corresponding hedged items and hedging instruments;

wherein:

to input a new simulated relationship assignment, each displayed hedging instrument of the displayed hedging relationship definitions and of the displayed simulated hedging relationship assignments is selectable and draggable between each of the displayed hedging relationship definitions and each of the displayed simulated hedging relationship assignments; and the tree-structure includes at least one currency node, each currency node divisible into a plurality of interest rate nodes, each interest rate node divisible into a plurality of hedging relationship nodes, each hedging relationship node divisible into a plurality of hedging instrument and hedged item nodes.

2. A method for evaluation of hedging relationships, comprising:

in response to an inputted selection of a simulated hedging relationship assignment, calculating at least one effectiveness value for the simulated hedging relationship assignment;

displaying a hierarchical tree-structured list of hedging relationship definitions and of simulated hedging relationship assignments, including corresponding hedged items and hedging instruments; and displaying a list of unassigned hedging, wherein, to input a new simulated relationship assignment:

each displayed hedging instrument of the displayed hedging relationship definitions and of the displayed simulated hedging relationship assignments is selectable and draggable between each of the displayed hedging relationship definitions and each of the displayed simulated hedging relationship assignments;

each unassigned instrument is selectable and draggable into one of a displayed hedging relationship and a displayed simulated hedging relationship assignment; and each hedging instrument of each of the displayed hedging relationship definitions and of the displayed simulated hedging relationship assignments is selectable and draggable from the displayed hedging relationship definitions and simulated hedging relationship assignments to the list of unassigned instruments.

3. A method for evaluation of hedging relationships, comprising:

in response to an inputted selection of a simulated hedging relationship assignment, calculating at least one effectiveness value for the simulated hedging relationship assignment; and displaying a hierarchical tree-structured list of hedging relationship definitions and of simulated hedging relationship assignments, including corresponding hedged items and hedging instruments, wherein at least one of a particular displayed hedging relationship definition and a particular displayed simulated hedging relationship assignment is selectable; and displaying the at least one effectiveness value of a selected relationship; wherein, to input a new simulated relationship assignment, each displayed hedging instrument of the displayed hedging relationship definitions and of the displayed simulated hedging relationship assignments is selectable and draggable between each of the displayed hedging relationship definitions and each of the displayed simulated hedging relationship assignments.

4. The method of claim 3, wherein a plurality of displayed hedging relationships is simultaneously selectable via a selection of a parent node of the plurality of displayed hedging relationships.

5. The method of claim 3, further comprising:

in response to the selection of the selected relationship, returning the at least one effectiveness value of the selected relationship from a memory location, if therein; and otherwise:

calculating the at least one effectiveness value of the selected relationship; and returning the calculated at least one effectiveness value of the selected relationship.

6. A method for evaluation of hedging relationships, comprising:

in response to an inputted selection of a simulated hedging relationship assignment, calculating at least one effectiveness value for the simulated hedging relationship assignment;

storing in a memory location a plurality of hedging instruments and a plurality of hedged items; and in response to the inputted selection of the simulated hedging relationship assignment, surveying the memory location for at least one hedging instrument that corresponds to the simulated hedging relationship assignment and for at least one hedged item that corresponds to a hedged item characteristic set of the simulated hedging relationship assignment, wherein the at least one effectiveness is a ratio of a cash flow of the at least one hedged item to a cash flow of the at least one hedging instrument.

7. The method of claim 6, wherein a ratio value of less than one indicates that the simulated hedging relationship assignment is effective.

* * * * *